United States Patent [19]

Mueller

[11] 4,163,805

[45] Aug. 7, 1979

[54] RECONSTITUTED FOOD PRODUCT

[75] Inventor: Richard A. Mueller, Donnellson, Iowa

[73] Assignee: SCM Corporation, New York, N.Y.

[21] Appl. No.: 753,805

[22] Filed: Dec. 23, 1976

Related U.S. Application Data

[63] Continuation-in-part of Ser. No. 644,108, Dec. 24, 1975, abandoned.

[51] Int. Cl.$^2$ ................................................ A23L 1/04
[52] U.S. Cl. .................................... 426/575; 426/615; 426/803; 426/104
[58] Field of Search .............. 426/575, 615, 803, 104, 426/282, 92

[56] References Cited

U.S. PATENT DOCUMENTS

| 2,351,788 | 6/1944 | Smith | 426/575 |
|---|---|---|---|
| 2,791,508 | 5/1957 | Rivoche | 426/575 |
| 2,992,925 | 7/1961 | Green | 426/92 |
| 3,352,688 | 11/1967 | Messina | 426/575 |
| 3,932,673 | 1/1976 | Webster | 426/577 |
| 4,006,256 | 2/1977 | Kyras | 426/102 |

*Primary Examiner*—Jeanette M. Hunter
*Attorney, Agent, or Firm*—Richard H. Thomas

[57] ABSTRACT

A reconstituted food product is prepared from a natural food item by mixing such food item in finely-divided form with water and an aqueous algin dry mix containing a carbohydrate, forming the resulting dispersion into a predetermined shape, and contacting said shape with a gelling solution containing calcium ion for a time period sufficient to harden the algin containing dispersion. The invention has particular applicability in the preparation of a pimiento containing product for use in stuffed olives.

9 Claims, No Drawings

RECONSTITUTED FOOD PRODUCT

This application is a continuation-in-part of prior application Ser. No. 644,108, now abandoned, filed Dec. 24, 1975, assigned to assignee of the present application.

The present invention relates to a method for the preparation of a reconstituted food product from a finely-divided or comminuted natural food item, and to the food product made thereby, wherein the reconstituted food product has essentially the same texture and taste as the food item.

The invention is particularly applicable to the preparation of a reconstituted pimiento containing product from natural pimiento which has been comminuted or finely divided, wherein said pimiento product is capable of retaining its integrity in an aqueous environment, is capable of being mechanically inserted into the hollow core of a pitted olive to yield a stuffed olive, and offers essentially the same fibrous, semi-crisp texture and taste as natural pimiento.

BACKGROUND OF THE INVENTION

Approximately 35% of the cost of producing stuffed olives at commercial plants is caused by labor and waste, particularly in hand-cutting and stuffing of pimientos into the pitted olives. The high cost is also due in part to the varying shapes of the pimiento peppers, and conventionally there will be a 10-30% loss of peppers which cannot be utilized in the stuffing operation for stuffed olives.

In addition, pimiento peppers are not uniform in color, varying from a deep red to an orange, and are traditionally graded by color. An advantage in employing a reconstituted pimiento containing product from natural pimiento is that pimientos of varying color can be blended to obtain a product of uniform color.

Equipment has been developed that can utilize a pimiento "sheet" and, through the use of various cutters, stuff olives with little or no hand labor or waste. For this purpose, it is known to comminute the pimiento peppers and then form them into a uniform sheet to be handled in the automatic cutting and stuffing equipment. One product on the market has the ingredient statement on its label which reads: "Olives, water, pimiento, salt, citrus pectin, calcium chloride, artificial color, calcium phosphate." This product suffers from the disadvantage that it does not have the appearance, texture or flavor of a natural pimiento.

A puree pimiento product being proposed by Sadrym and/or Alginate Industries, Ltd., a division of Imperial Chemical Company, is said to contain pimiento, sodium alginate, guar gum, cellulose and calcium chloride. This product although better than that mentioned above, still fails to have the texture and taste of natural pimiento. It is not known whether the product is prior art under the U.S. Patent Laws.

In addition to texture and flavor, it is necessary for a reconstituted pimiento product to be as close as possible to a natural pimiento with regard to color and odor as well. It is also necessary that the reconstituted product be capable of retaining its integrity in an aqueous environment, and be capable of mechanical insertion into the hollow core of a pitted olive.

Alginates, because of their interesting properties, have found numerous applications in the food industry, for instance as thickening agents, suspending agents, stabilizing or emulsifying agents, gel producers, and film forming agents, where they can be incorporated without inhibiting or masking flavor. The alginates such as sodium, potassium and ammonium are very water soluble and can be made to form smooth gels from water systems by the controlled release of calcium ion. The gels are chemically set, irreversible and do not melt on heating. Typical uses for such gel systems include pie fillings, ice cream, confectionary gels, French dressing, meat sauce, dessert gels, milk puddings, frozen fruits and others. U.S. Pat. No. 2,403,547 (Peschardt) discloses the manufacture of artificial edible cherries and the like using a sodium alginate water system.

SUMMARY OF THE INVENTION

The present invention relates in its broadest aspect to a reconstituted food product which is prepared from a natural food item by first making a formulation containing such food item, in finely-divided form, water, and a water soluble alginate binder, and gelling said formulation into a predetermined shape, the improvement wherein said formulation contains a carbohydrate comprising at least one sugar selected from the group consisting of monosaccharides and disaccharides.

More particularly, the present invention relates to a process for making reconstituted flesh of olive-stuffing pimiento wherein said pimiento in comminuted form is blended into a formulation containing water and water soluble alginate binder and the formulation is then gelled into a predetermined shape, the present invention comprising the improvement of incorporating into said formulation said carbohydrate, the formulation comprising the following ingredients: about 30% to 75% of finely-divided, unsalted pimiento peppers, preferably about 50%; about 6% to about 24%, preferably about 10 to 12%, of an aqueous algin dry mix containing a carbohydrate comprising at least one sugar selected from the group consisting of monosaccharides and disaccharides; and the remainder being water. The formulation is thoroughly blended and then formed into a predetermined shape and contacted with a gelling solution containing calcium ion for a sufficient time period to harden the algin containing dispersion.

An essential feature of the present invention is that the pimientos be desalted prior to formulation. Otherwise, a mushy texture results. The pimiento peppers must be finely ground, for instance in a high-speed mixer such as a Waring blender, sufficient to insure even distribution, following formulation, of the algin dry mix with the pimiento.

By the present invention, a product is obtained which has the same texture and taste as natural pimiento, which can be mechanically inserted into the hollow core of a pitted olive to yield a stuffed olive, and which offers the same texture and taste as natural pimiento. It is also heat stable when baked for 20 minutes at 475° F. and is storage stable or capable of retaining its integrity in a salt and lactic acid brine (aqueous environment).

One algin and carbohydrate containing dry mix which is available commercially is marketed under the trademark "FLAVOR-TEX #1" by D. H. McKee Company, Tampa, Fla. The gelling solution is also marketed by D. H. McKee Company under the trademark "FLAVOR-TEX #2." Details of the D. H. McKee Company products may be found in prior U.S. Pat. No. 3,395,024, Roland D. Earle, issued July 30, 1968. The disclosure of this patent is incorporated herein by reference.

As set forth in such patent, suitable carbohydrate monosaccharide and disaccharide sugars include sucrose, lactose, fructose, arabinose, maltose, dextrose, galactose, xylose, etc. However, dextrose, particularly dry forms of dextrose wherein the dextrose comprises at least 75% by weight of carbohydrate solids on a dry basis, is preferred. This is because of a relatively low sweetness level of the dextrose which reduces the possibility of the pimiento product acquiring an undesirable sweetness, because the monosaccharide is not susceptible to further enzymatic degradation to another low sugar, because of its availability, and also because of its inexpensiveness. Suitable dry forms of dextrose include crystalline alpha dextrose hydrate, anhydrous dextrose, high dextrose content dried syrup (known as dextrose and corn syrup solids), and so-called chipped sugar having about 80% dextrose.

Liquid corn syrups of high, intermediate and low dextrose content can also be employed as the source of mono and/or disaccharide sugar. For example, various high dextrose syrups containing from about 75 to 98% dextrose are available. Intermediate and low dextrose corn syrups are less desirable than the high dextrose syrups since they do not give the same degree of preservation to the reconstituted pimiento product as do the high dextrose materials, and since they are more susceptible to enzyme degradation.

Any water soluble algin that will gel with calcium salts, such as sodium or potassium and ammonium salts of alginic acid, may be satisfactorily used. Sodium alginate in its less degraded form, namely the high viscosity grades, is preferred.

The dry algin mix preferably contains about 2½ to 20 parts by dry weight of water-soluble alginate to about 97.5 to 80 parts by dry weight of carbohydrate comprising the mono and/or disaccharide sugars, preferably dextrose. A preferred formulation is obtained by dry mixing about 10% of high viscosity sodium alginate, for instance Kelco-gel HV (registered trademark of Kelco Company) with about 90% of dextrose monohydrate.

The gelling solution can contain any water-soluble source of calcium ions, such as calcium chloride, calcium gluconate, calcium acetate, calcium propionate, calcium lactate, etc. Preferably, the gelling is carried out at room temperature. The shaped formulation should be contacted with the gelling solution for a period of time sufficient to harden the algin containing dispersion, but not so long as to cause bitterness in the product.

In general, the retention time of contact with the gelling solution depends upon the concentration of the calcium in the solution. The stronger the solution, the less retention time required. For example, a firm gel can be produced using 0.5 molar solution of calcium chloride with a retention time of as little as 30 seconds, although longer retention times, e.g., 15–20 minutes, are preferred. No bitter taste results and the hardened algin containing product is strong enough to be handled without cracking or breaking following gelling. Care, however, should be exercised in using more concentrated calcium ion gelling solutions since the higher the concentration of calcium, the greater the probability of imparting a bitter taste to the treated food.

In many commercial operations, conventional gelling times are considered too time consuming while the use of more concentrated calcium ion gelling solutions requires too much care for routine operation (i.e., skilled operators and timing apparatus). The gelling time can be reduced by adding an edible gum or gum-like thickening agent to the calcium ion gelling bath in sufficient quantities to give the gelling solution a Brookfield viscosity of between 5 and 250 centipoises, preferably 50 to 100 centipoises, at room temperature. A firm, strong product is formed without imparting bitterness to the reconstituted pimiento on contacting the algin-dextrose containing formulation with the gelling bath. Using a preferred concentration of thickener, e.g., about 1%, the time of immersion is less critical. However, as the viscosity of the gelling composition increases the possibility of imparting bitterness to the treated food increases.

Any gum or gum-like thickening agent which is edible and which will not be precipitated by calcium ions can be used as the thickening agent. Suitable edible gums are at least one member selected from the group consisting of plant gums, dextran, alkali metal salt or carboxymethyl cellulose and cellulose ethers. Sodium carboxymethyl cellulose (Hercules Powder 7-MP) is one such substance. Concentrations of sodium carboxymethyl cellulose of between 0.75% and 1.25% by weight are preferred, although other concentrations between the range of 0.25% and 2.50% can also be used. Biochemical gums in concentrations of about 0.1% to 0.5% can also be used. Other edible gums include Klucal HW (propylene glycol ester of carboxymethyl cellulose), methyl cellulose and gum karaya.

EXAMPLE 1

This example illustrates a method by which a comminuted pimiento mixture may be extruded and gelled into a sheet form for use with automatic olive stuffing equipment. This product has the appearance, flavor and texture of a natural pimiento pepper. It is also heat stable when baked for 20 minutes at 475° F. and is storage stable in a salt and lactic acid brine.

The following formulation was prepared:

| | |
|---|---|
| Unsalted pimiento peppers | 50% |
| Water | 40% |
| FLAVOR-TEX #1 (dry mix) | 10% |
| Total | 100% |

The formulation was prepared by placing the water in a high-speed mixer (e.g., a Waring blender), and agitating it. The FLAVOR-TEX #1 was slowly added to the water and agitated until a uniform mixture was obtained. The agitation was continued, and the pimientos (in finely ground state) were slowly added and the same blended until a uniform mixture was obtained. This mixture was then spread on a flat surface to a thickness of one-eighth inch to one-quarter inch. A solution of FLAVOR-TEX #2 was poured onto the spread. A knife blade was passed beneath the pimiento containing mixture to assure that its entire surface area was contacted by the FLAVOR-TEX #2. Soaking of the mixture by the FLAVOR-TEX #2 was continued for 15–20 minutes, followed by washing, cutting and olive stuffing. The olives were then stored in a lactic acid and salt brine.

The FLAVOR-TEX #1 in this Example was a dry mix containing approximately 10% sodium alginate (Kelco-gel HV, a high viscosity sodium alginate) and approximately 90% dextrose monohydrate. The FLAVOR-TEX #2 was a 0.5 molar solution of calcium chloride containing about 1.0% sodium carboxymethyl cellulose to impart a Brookfield viscosity at room temperature of between 50–100 centipoises.

The following Examples illustrate application of the concepts of the present invention to food items other than pimiento.

EXAMPLE 2

The following formulation was used in the preparation of a reconstituted, semi-crisp onion product:

| Onion Puree | |
|---|---|
| Formula | % by Weight |
| Onion Pieces | 50.00 |
| Water | 40.00 |
| Dextrose Monohydrate | 9.00 |
| Sodium Alginate | 1.00 |
| Total | 100.00 |

Onion pieces from a whole peeled onion, the sodium alginate, the dextrose monohydrate and water were placed in a high-speed, laboratory-type Waring blender for about 5 minutes or until a vortex was formed. The particle size of the onion pieces is not critical, except that they have to be small enough to be subject to further size reduction in the Waring blender. The sodium alginate and dextrose monohydrate were, as in Example 1, added as a pre-mix.

Following vortexing, the pureed mixture was fed into a puree sheet-forming apparatus having a conveying system which carried the contents through a calcium chloride/sodium carboxymethyl cellulose solution essentially the same as that of the FLAVOR-TEX #2 of Example 1, except that the solution was about 0.8 molar instead of 0.5 The resulting product was a continuous sheet in gelled form which was approximately 6 inches in width and about ¼ inch thick, although these dimensions are in no way limiting. A large variety of product sheet sizes can be fabricated, depending upon final intended use. The food product had a taste which was close to that of the natural onion, and also a texture which was close to that of the natural onion. The texture of the final reconstituted onion product can best be described as semi-crisp, in about the same sense that natural onion is semi-crisp. For instance, it is frangible and can be readily crumbled into particulates. It is flexible, chewy and fibrous, all properties possessed by natural onion. On a scale of one to ten between mushy on the one hand and crisp on the other hand, the product by observation fell into a range between about six and eight, an onion itself being at the upper end of this range.

EXAMPLE 3

The following formulations were employed in the preparation of additional semi-crisp food products in accordance with the concepts of the present invention. The procedure of Example 2 was used in each instance.

| Apple Puree | |
|---|---|
| Formula | % by Weight |
| Apple Pieces | 50.00 |
| Water | 40.00 |
| Dextrose Monohydrate | 9.00 |
| Sodium Alginate | 1.00 |
| Total | 100.00 |

| Salami Puree | |
|---|---|
| Formula | % by Weight |
| Salami Pieces | 35.09 |
| Water | 56.14 |
| Dextrose Monohydrate | 7.89 |
| Sodium Alginate | 0.88 |
| Total | 100.00 |

| Potato Puree | |
|---|---|
| Formula | % by Weight |
| Potato (blanched) Pieces | 50.00 |
| Water | 40.00 |
| Dextrose Monohydrate | 9.00 |
| Sodium Alginate | 1.00 |
| Total | 100.00 |

Each of the above products were semi-crisp in about the same sense that the original food item can be characterized as being semi-crisp, semi-crisp being defined as in Example 2. For instance, salami is frangible in nature in that it can be readily crumbled into particulates. Similarly, the reconstituted food product employing salami could be crumbled. Similarly, the reconstituted food product employing apple pieces was semi-crisp being readily crumbled into particulates to the same degree as the original food item. The same was true in the case of the reconstituted food product prepared from potato pieces.

It is possible to add to the puree mixture extraneous food items following vortexing. For instance, in the case of the reconstituted salami food product, one can add cheese particles to prepare a combination food product containing salami and cheese. Relish food particles can also be added and many other such food items. This may be carried out for the purpose of modifying the flavor of the food product or the mouth feel. For instance, with regard to the latter, the mouth feel of the reconstituted onion product can be varied by adding natural onion pieces to the puree mixture following vortexing. There is no particular criticality about the amount and particle sizing of extraneous pieces added, except that they should be small enough in particle size and in amount to blend into the quarter-inch thick reconstituted food product sheet without causing surface deformation, for instance protrusion from the surface of the sheet. In addition, the gelled puree should form a continuous matrix enrobing such extraneous pieces, and the amount and particle sizes of the extraneous pieces should not be such as to result in discontinuity in the final food product.

Each of the above food products may be used as is or may be further processed, such as by dehydrating, frying, freezing, heat processing, marinating, enrobing, size reducing, laminating, re-forming, and stuffing into other food products. It should be evident that many other food and non-food applications are also possible.

In the above Examples, it is desirable to obtain a firm set throughout the gelled sheet. This can be facilitated by incorporating into the puree mixture prior to vortexing an amount of the calcium chloride/carboxymethyl cellulose setting solution. This has the advantage that the puree mixture is subjected to the presence of calcium ions throughout. However, it is desirable to avoid any substantial preliminary gelling prior to extrusion or forming, as such extrusion or forming would tend to break down the partially gelled structure resulting in mushiness in the final product. This can be avoided by employing a relatively weak solution, for instance about 0.2 normal, and following up addition of the solution quickly with the forming or extrusion. By the term "substantial gelling," it is meant that amount or degree of gelling which could result in product mushiness from the forming or extrusion step.

In the above Examples, the mixing can be carried out in a variety of types of equipment. It should be relatively intensive such as is obtained in a Waring blender.

What is claimed is:

1. A process for making a reconstituted food product containing a semi-crisp natural food item which offers essentially the same semi-crisp texture and taste as said natural semi-crisp food item prepared by the steps of
   (a) blending said food item in comminuted, unsalted form with a formulation containing water, water-soluble alginate binder and a carbohydrate comprising at least one sugar having a low sweetness level selected from the group consisting of monosaccharides and disaccharides; said formulation consisting essentially of on a weight basis;
      (1) about 30% to about 75% of finely-divided, unsalted food product;
      (2) an effective amount of said water-soluble alginate binder;
      (3) said carbohydrate in the proportion of about 97.5–80 parts carbohydrate to about 2½–20 parts alginate, the alginate and carbohydrate together comprising about 6% to about 24% of the formulation; and
      (4) water;
   (b) subjecting said formulation to mixing;
   (c) forming said formulation following mixing into a desired shape without substantial preliminary gelling;
   (d) contacting said shape with a gelling solution containing calcium ion for a sufficient time period to harden the alginate and to produce said semi-crisp texture; and
   (e) cutting said shape into pieces of predetermined size.

2. A process for making reconstituted flesh of olive-stuffing pimiento which is capable of retaining its integrity in an aqueous environment, which can be mechanically inserted into the hollow core of a pitted olive to yield a stuffed olive, and which offers essentially the same semi-crisp texture and taste as olive-stuffing pimiento, comprising the steps of
   (a) blending said pimiento in comminuted, unsalted form into a formulation containing water and water-soluble alginate binder and a carbohydrate comprising at least one sugar having a low sweetness level selected from the group consisting of monosaccharides and disaccharides; said formulation consisting essentially of on a weight basis
      (1) about 30% to about 75% of finely-divided unsalted pimiento;
      (2) an effective amount of said water-soluble alginate binder;
      (3) said carbohydrate in the proportion of about 97.5–80 parts carbohydrate to about 2½–20 parts alginate, the alginate and carbohydrate together comprising about 6% to about 4% of the formulation; and
      (4) water;
   (b) subjecting said formulation to mixing;
   (c) forming said formulation into a desired shape without substantial preliminary gelling;
   (d) contacting said shape with a gelling solution containing calcium ion for a sufficient time period to harden the alginate and to produce said semi-crisp texture; and
   (e) cutting said shape into pieces of predetermined size.

3. The process of claim 2 further including the step prior to mixing of preparing a dry mix of said alginate and said carbohydrate, in the proportions stated, wherein said formulation comprises the following:

| | | |
|---|---|---|
| Unsalted pimiento peppers | about | 50% |
| Water | about | 40% |
| Aqueous alginate dry mix | about | 10% |
| Total | | 100%. |

4. The process of claim 3 wherein at least about 75% by weight of said carbohydrate is dextrose.

5. The process of claim 4 wherein said aqueous alginate mix comprises about 50 parts sodium alginate dry and about 450 parts dextrose monohydrate.

6. The process of claim 5 wherein said gelling solution comprises a gum thickening agent.

7. A process for making a reconstituted food product containing a semi-crisp natural food item which offers essentially the same semi-crisp texture and taste as said natural semi-crisp food item prepared by the steps of
   (a) blending said food item in comminuted, unsalted form with a formulation containing water, water-soluble alginate binder and a carbohydrate comprising at least one sugar having a low sweetness level selected from the group consisting of monosaccharides and disaccharides; said formulation consisting essentially of on a weight basis;
      (1) about 30% to about 75% of finely-divided, unsalted food product;
      (2) an effective amount of said water-soluble alginate binder;
      (3) said carbohydrate in the proportion of about 97.5–80 parts carbohydrate to about 2½–20 parts alginate, the alginate and carbohydrate together comprising about 10% to about 12% of the formulation; and
      (4) water;
   (b) subjecting said formulation to mixing;
   (c) forming said formulation following mixing into a desired shape without substantial preliminary gelling;
   (d) contacting said shape with a gelling solution containing calcium ion for a sufficient time period to harden the alginate and to produce said semi-crisp texture; and
   (e) cutting said shape into pieces of predetermined size.

8. A process for making reconstituted flesh of olive-stuffing pimiento which is capable of retaining its integrity in an aqueous environment, which can be mechanically inserted into the hollow core of a pitted olive to yield a stuffed olive, and which offers essentially the same semi-crisp texture and taste as olive-stuffing pimiento, comprising the steps of
   (a) blending said pimiento in comminuted, unsalted form into a formulation containing water and water-soluble alginate binder and a carbohydrate comprising at least one sugar having a low sweetness level selected from the group consisting of monosaccharides and disaccharides; said formulation consisting essentially of on a weight basis
(1) about 30% to about 75% of finely-divided unsalted pimiento;
(2) an effective amount of said water-soluble alginate binder;
(3) said carbohydrate in the proportion of about 97.5–80 parts carbohydrate to about 2½–20 parts alginate, the alginate and carbohydrate together comprising about 10% to about 12% of the formulation; and
(4) water;
(b) subjecting said formulation to mixing;
(c) forming said formulation into a desired shape without substantial preliminary gelling;
(d) contacting said shape with a gelling solution containing calcium ion for a sufficient time period to harden the alginate and to produce said semi-crisp texture; and
(e) cutting said shape into pieces of predetermined size.

9. The process of claim 1, 7 or 8 wherein at least about 75% by weight of said carbohydrate in dextrose.

* * * * *

UNITED STATES PATENT AND TRADEMARK OFFICE
CERTIFICATE OF CORRECTION

PATENT NO. : 4,163,805
DATED : August 7, 1979
INVENTOR(S) : Richard A. Mueller

It is certified that error appears in the above-identified patent and that said Letters Patent are hereby corrected as shown below:

Column 7, line 65, in claim 2, change "4%" to --24%--.
Column 8, line 24, in claim 5, delete "dry" after "alginate" and insert --dry-- before "mix". Column 10, line 12, in claim 9, change "in" after "carbohydrate" to --is--.

Signed and Sealed this

Thirtieth Day of October 1979

[SEAL]

Attest:

RUTH C. MASON
Attesting Officer

LUTRELLE F. PARKER
Acting Commissioner of Patents and Trademarks